(12) United States Patent
Seo et al.

(10) Patent No.: US 9,492,902 B2
(45) Date of Patent: Nov. 15, 2016

(54) MACHINE TOOL

(71) Applicant: HORKOS CORPORATION, Hiroshima (JP)

(72) Inventors: Yoshinori Seo, Hiroshima (JP); Kunihiro Ikeda, Hiroshima (JP)

(73) Assignee: HORKOS CORPORATION, Hiroshima (JP)

( * ) Notice: Subject to any disclaimer, the term of this patent is extended or adjusted under 35 U.S.C. 154(b) by 513 days.

(21) Appl. No.: 14/127,097

(22) PCT Filed: Sep. 27, 2013

(86) PCT No.: PCT/JP2013/005760
§ 371 (c)(1),
(2) Date: Dec. 17, 2013

(87) PCT Pub. No.: WO2014/061210
PCT Pub. Date: Apr. 24, 2014

(65) Prior Publication Data
US 2016/0167182 A1 Jun. 16, 2016

(30) Foreign Application Priority Data

Oct. 16, 2012 (JP) .................. 2012-229347

(51) Int. Cl.
| B23Q 1/01 | (2006.01) |
| B23Q 1/62 | (2006.01) |
| B23Q 3/157 | (2006.01) |
| B23Q 11/00 | (2006.01) |
| B23Q 11/08 | (2006.01) |
| B23C 1/027 | (2006.01) |
| B23C 1/00 | (2006.01) |

(52) U.S. Cl.
CPC .............. *B23Q 1/015* (2013.01); *B23C 1/002* (2013.01); *B23C 1/027* (2013.01); *B23Q 1/012* (2013.01);

(Continued)

(58) Field of Classification Search
CPC .......... Y10T 409/309576; Y10T 409/307728; Y10T 409/308288; B23C 1/027; B23C 1/002
USPC ...................... 409/235, 202, 212
See application file for complete search history.

(56) References Cited

U.S. PATENT DOCUMENTS

| 5,662,568 A * | 9/1997 | Lindem ................. B23Q 1/017 408/234 |
| 6,519,823 B1 * | 2/2003 | Sugata .................. B23Q 1/015 29/26 A |

(Continued)

FOREIGN PATENT DOCUMENTS

| DE | 102006034738 A1 * | 1/2008 |
| DE | 102011080457 A1 * | 2/2013 |

(Continued)

OTHER PUBLICATIONS

Machine Translation of JP 11-099424, which JP '424 was published Apr. 1999.*

*Primary Examiner* — Erica E Cadugan
(74) *Attorney, Agent, or Firm* — Osha Liang LLP

(57) ABSTRACT

A machine tool includes a base column having a base portion and a column portion provided on the base portion, a first saddle supported behind the column portion and movable in a left-right direction, a second saddle supported on the first saddle and movable in a vertical direction, a spindle unit supported on the second saddle and movable in a front-back direction, a pair of X-axis guide mechanisms for guiding movements of the first saddle in the left-right direction, a pair of Y-axis guide mechanisms for guiding movements of the second saddle in the vertical direction, and a pair of Z-axis guide mechanisms for guiding movements of the spindle unit in the front-back direction.

20 Claims, 8 Drawing Sheets

(52) U.S. Cl.
CPC ............... *B23Q 1/017* (2013.01); *B23Q 1/626* (2013.01); *B23Q 3/157* (2013.01); *B23Q 11/0067* (2013.01); *B23Q 3/15706* (2013.01); *B23Q 3/15766* (2013.01); *B23Q 11/085* (2013.01); *Y02P 70/171* (2015.11); *Y10T 408/91* (2015.01); *Y10T 409/30392* (2015.01); *Y10T 409/304088* (2015.01); *Y10T 409/307112* (2015.01); *Y10T 409/308288* (2015.01); *Y10T 409/309576* (2015.01); *Y10T 483/1795* (2015.01)

(56) References Cited

U.S. PATENT DOCUMENTS

| | | | | |
|---|---|---|---|---|
| 6,843,624 | B2 * | 1/2005 | Sugata | B23Q 1/015 408/234 |
| 7,043,805 | B2 * | 5/2006 | Tokuma | B23B 3/168 29/27 C |
| 7,189,194 | B1 * | 3/2007 | Takayama | B23Q 1/626 408/234 |
| 8,506,216 | B2 * | 8/2013 | Hiroshima | B23Q 1/015 409/191 |
| 8,517,901 | B2 * | 8/2013 | Hiroshima | B23Q 1/56 409/191 |
| 2004/0140721 | A1 * | 7/2004 | Chang | B23Q 1/626 310/12.05 |

FOREIGN PATENT DOCUMENTS

| | | | |
|---|---|---|---|
| JP | 10-180593 A | * | 7/1998 |
| JP | 11-099424 A | * | 4/1999 |
| JP | H11-216633 A | | 8/1999 |
| JP | 2000-061755 A | * | 2/2000 |
| JP | 2005-313250 A | | 11/2005 |
| JP | 4542001 B2 | | 9/2010 |
| KR | 10-1201386 B1 | * | 11/2012 |
| WO | 2010-113617 A1 | | 10/2010 |

* cited by examiner

MACHINE TOOL

CROSS-REFERENCE TO RELATED APPLICATIONS

This application is a National Stage application of International Patent Application No. PCT/JP2013/005760, filed on Sep. 27, 2013, which claims priority pursuant to 35 U.S.C. §119(a) to Japanese Patent Application No. 2012-229347, filed on Oct. 16, 2012. Both priority applications are hereby incorporated by reference in their entirety.

BACKGROUND OF THE INVENTION

1. Field of the Invention

One or more embodiments of the present invention relate to a machine tool such as a machining center and, more particularly, to a horizontal machine tool with a spindle in a horizontal orientation.

2. Background Art

As a horizontal machine tool, there are known related-art machining centers as described in Patent Literatures 1 to 4.

In Patent Literature 1, a gantry column which is a structure separate from a base stands on the base by being fixed by bolts. X-axis guide rails are provided to upper and lower portions of a front side of the gantry column and a saddle is guided by the X-axis guide rails to be movable in a left-right direction. The saddle is provided with Y-axis guide rails and a spindle head is guided by the Y-axis guide rails to be movable in a vertical direction. In this way, the spindle is movable in the left-right and vertical directions.

Patent Literature 2 discloses a machining center in which a spindle is movable in a front-back direction (Z-axis direction) in addition to the same structure as that in Patent Literature 1.

A machining center in Patent Literature 3 includes: a bed having a base portion and a pair of side walls standing on opposite end portions of the base portion; a frame-shaped first feed table supported on back faces of the respective side walls of the bed and movable in a vertical direction; a second feed table disposed in the frame of the first feed table and movable in a left-right direction; a spindle head disposed in a through hole provided in the second feed table and movable in a front-back direction; and a spindle supported on the spindle head.

A machining center in Patent Literature 4 includes: a base frame on which a workpiece support face is formed; an X-axis saddle mounted to a back face portion of the base frame to be movable in a left-right direction with an X-axis movement mechanism interposed therebetween; a Y-axis saddle mounted to a back face portion of the X-axis saddle to be movable in a vertical direction with an Y-axis movement mechanism interposed therebetween; and a spindle unit mounted to an upper face portion of an extending portion of the Y-axis saddle to be movable in a front-back direction with a Z-axis movement mechanism interposed therebetween.

CITATION LIST

Patent Literatures

Patent Literature 1: Japanese Laid-Open Patent Publication No. 2005-313250
Patent Literature 2: Japanese Laid-Open Patent Publication No. 11-216633
Patent Literature 3: Japanese Patent No. 4542001
Patent Literature 4: Domestic Re-publication of PCT International Publication for Patent Application No. WO2010/113617

In each of the machining centers in Patent Literatures 1 and 2, a work table provided onto the base is disposed in front of the gantry column and a thickness (height in the vertical direction) of the base needs to be large in order to prevent a twist and the like of the base, which increases a height of the machine. In this case, a lowest travel position of the spindle is also high and a center of gravity is high. Thus, in order to secure stability and rigidity, the whole machine is increased in size. Moreover, if the lowest travel position of the spindle is high, a mounted height of a workpiece is also high and a stepstool is necessary to carry out detachment and attachment operations of the workpiece. Furthermore, the stepstool is necessary to carry out a minor inspection and maintenance of a tip end of the spindle and a tool, which causes inconvenience.

Additionally, because movable portions such as the saddle and a cover are disposed in front of the column, a front-back depth of the machine increases due to accumulation of each depth of the column, the saddle, the cover, and the like, which inevitably increases the size of the whole machine. Furthermore, it is impossible to carry out maintenance of movement mechanisms and the like unless the cover is detached, which causes inconvenience.

On the other hand, if the movable portions such as the feed tables are disposed behind the bed (column) as in Patent Literature 3, it is possible to shorten a depth of the bed in the front-back direction to downsize the whole machine. Moreover, it is possible to easily perform maintenance on the machine from behind.

In the case of Patent Literature 4, although a gantry column is not provided, it is possible to shorten a front-back depth of the base frame to downsize the whole machine by providing the saddles and the movement mechanisms behind the base frame.

However, in Patent Literature 3, an X-axis guide rail forming an X-axis movement mechanism is disposed behind a Y-axis guide rail forming a Y-axis movement mechanism at a distance from the Y-axis guide rail. Therefore, paths for transmitting forces by the respective movement mechanisms to a jig portion are long and accumulation of dimension change amounts of respective parts due to thermal expansion cause decrease in machining accuracy of a workpiece.

In Patent Literature 4, in contrast to Patent Literature 3, the Y-axis guide rail forming the Y-axis movement mechanism is disposed behind the X-axis guide rail forming the X-axis movement mechanism at a distance from the X-axis guide rail. In this case, there is still a similar disadvantage to that in Patent Literature 3.

SUMMARY OF THE INVENTION

One or more embodiments of the present invention provide a machine tool in which the whole machine can be downsized, maintenance can be performed easily, and which can machine a workpiece with high accuracy.

A horizontal machine tool according to one or more embodiments includes: a base column having a base portion and a column portion provided on the base portion; a first saddle supported behind the column portion and movable in a left-right direction; a second saddle supported on the first saddle and movable in a vertical direction; a spindle unit supported on the second saddle and movable in a front-back direction; a pair of X-axis guide mechanisms for guiding movements of the first saddle in the left-right direction; a pair of Y-axis guide mechanisms for guiding movements of the second saddle in the vertical direction; and a pair of Z-axis guide mechanisms for guiding movements of the spindle unit in the front-back direction.

The base portion has a base front portion in front of the column portion and a base back portion behind the column portion, respectively, and a top surface of the base back portion is lower than a top surface of the base front portion. The first saddle is disposed on the top surface of the base back portion. At least one of the pair of X-axis guide mechanisms and each of the pair of Y-axis guide mechanisms are provided between the first saddle and the column portion and positioned substantially in the same plane.

With this structure, the movable portions such as the first saddle and the second saddle are disposed behind the column portion and thus a front-back depth of the machine tool is shortened and the whole machine can be downsized. Furthermore, maintenance can be carried out easily from behind the machine tool.

Because the X-axis guide mechanism and the Y-axis guide mechanism are positioned substantially in the same plane, paths for transmitting forces to a jig portion are shortened, which suppresses accumulation of dimension change amounts of the respective parts due to thermal expansion to thereby enhance machining accuracy of a workpiece. Further tore, because the X-axis guide mechanism and the Y-axis guide mechanism are not separated from each other in the front-back direction, it is possible to further downsize the whole machine.

By disposing the movable portions behind the column portion, a thickness of the base front portion in front of the column portion can be secured and a thickness of the base back portion behind the column portion can be reduced. Because the first saddle is disposed on the top surface of the base back portion having the small thickness, it is possible to lower respective positions of the first saddle, the second saddle supported on the first saddle, and the spindle unit supported on the second saddle, as compared with those in the related art. Therefore, the center of gravity of the whole machine becomes low and stability increases. Moreover, because a lowest travel position of the spindle becomes low, it is possible to carry out detachment and attachment of the workpiece, inspection of the tip end of the spindle, inspection of the tools, and the like without using a stepstool.

In one or more embodiments of the present invention, one of the pair of X-axis guide mechanisms is provided between an upper portion of the first saddle and an upper portion of the column portion, and the other of the pair of X-axis guide mechanisms is provided between a lower portion of the first saddle and the top surface of the base back portion.

In one or more embodiments of the present invention, the first saddle has a vertically-long window at a center, and the second saddle moves in the vertical direction in the vertically-long window of the first saddle.

In one or more embodiments of the present invention, the column portion has a pair of pillar members standing on the base portion, and a square window is formed between the pair of pillar members. The square window has a vertical length which is equal to or greater than that of the vertically-long window of the first saddle.

In one or more embodiments of the present invention, the column portion is provided with a cover for covering the square window. The cover includes an X-axis cover movable in the left-right direction and a Y-axis cover movable in the vertical direction. The X-axis cover and the Y-axis cover are provided behind front faces of the pair of pillar members.

In one or more embodiments of the present invention, a front face of the upper portion of the column portion is provided with a reference face to which an automatic tool change unit can be mounted.

In one or more embodiments of the present invention, the base front portion of the base column is provided with a chute for discharging chips.

In one or more embodiments of the present invention, a front face of the base front portion of the base column is a reference face to which a jig table can be connected.

In one or more embodiments of the present invention, the column portion constitutes a frame-shaped first column fixed to the base portion, and the first saddle constitutes a frame-shaped second column movable with respect to the base portion. The machine tool includes a double-column structure having the first and second columns.

According to one or more embodiments of the present invention, it is possible to provide the machine tool in which the whole machine can be downsized, maintenance can be performed easily, and a workpiece can be machined with high accuracy.

DETAILED DESCRIPTION

Figure 1:
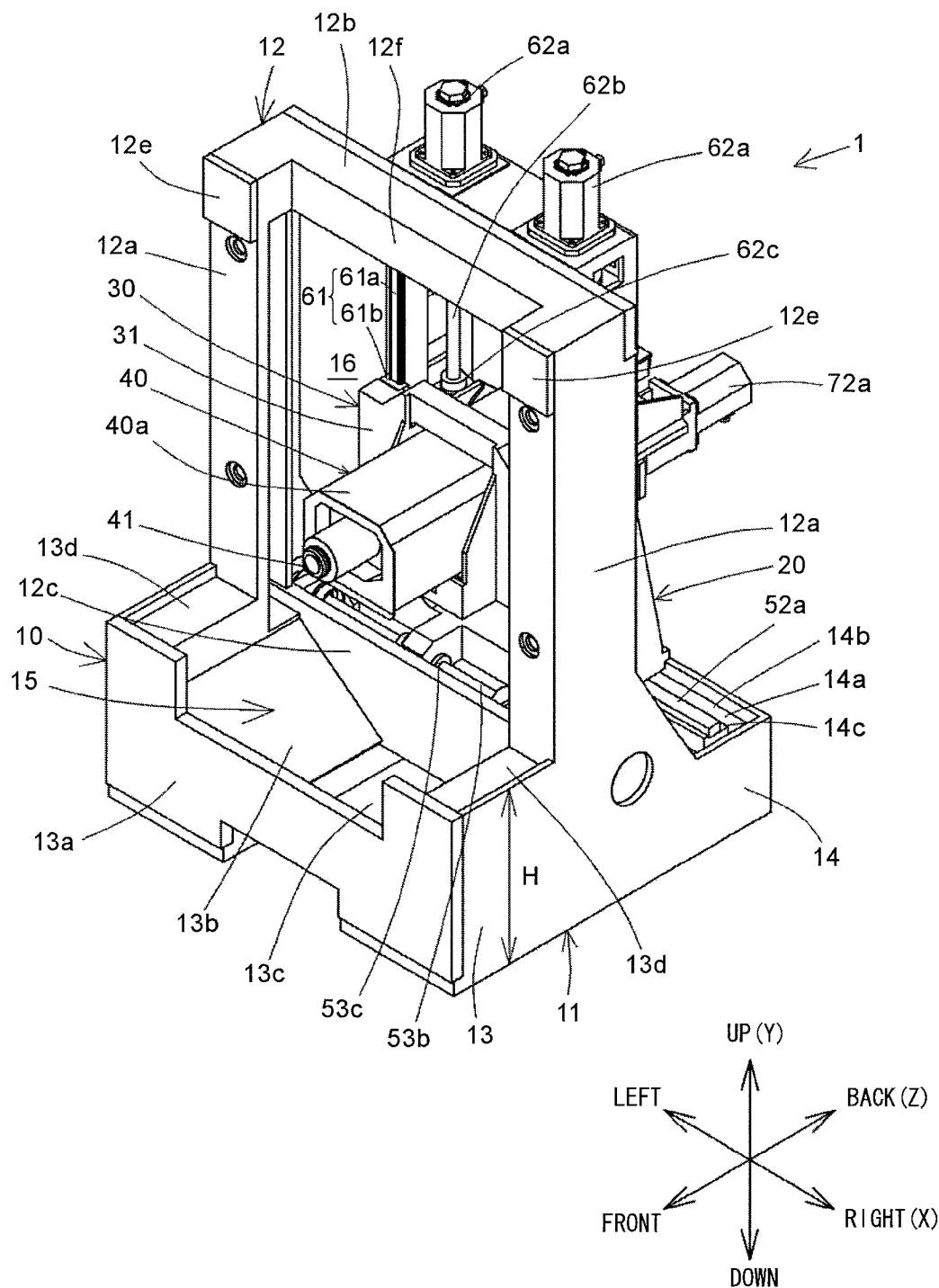
FIG. 1 is a perspective view of a horizontal machining center according to one or more embodiments of the present invention as seen from the front.

In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention. One or more embodiments of the present invention will be described below based on FIGS. 1 to 8. In the respective figures, the same or corresponding portions are provided with the same reference signs. Here, as a machining tool, a horizontal machining center will be taken as an example.

(1) General Structure of Horizontal Machining Center

A horizontal machining center 1 of one or more embodiments includes a base column 10, a first saddle 20 mounted to the base column 10 to be movable in a left-right direction, a second saddle 30 mounted to the first saddle 20 to be movable in a vertical direction, and a spindle unit 40 mounted to the second saddle 30 to be movable in a front-back direction.

Various tools are detachably attached to a tip end portion of a spindle 41 provided to the spindle unit 40. In the horizontal machining center 1, the spindle unit 40 moves in directions of three axes, i.e., the left-right direction (X-axis direction), the vertical direction (Y-axis direction), and the front-back direction (Z-axis direction) to cut a workpiece with a tool rotating integrally with the spindle 41.

(2) Base Column

The base column 10 includes a base portion 11 and a gantry column portion 12 provided on the base portion 11. Here, the base portion 11 and the column portion 12 are formed integrally. The base portion 11 is a portion at a lowest portion of the horizontal machining center 1 and installed onto a floor surface to fix the machine. The base portion 11 includes a base front portion 13 in front of the column portion 12 and a base back portion 14 behind the column portion 12 to increase stability of the machine.

Figure 3:
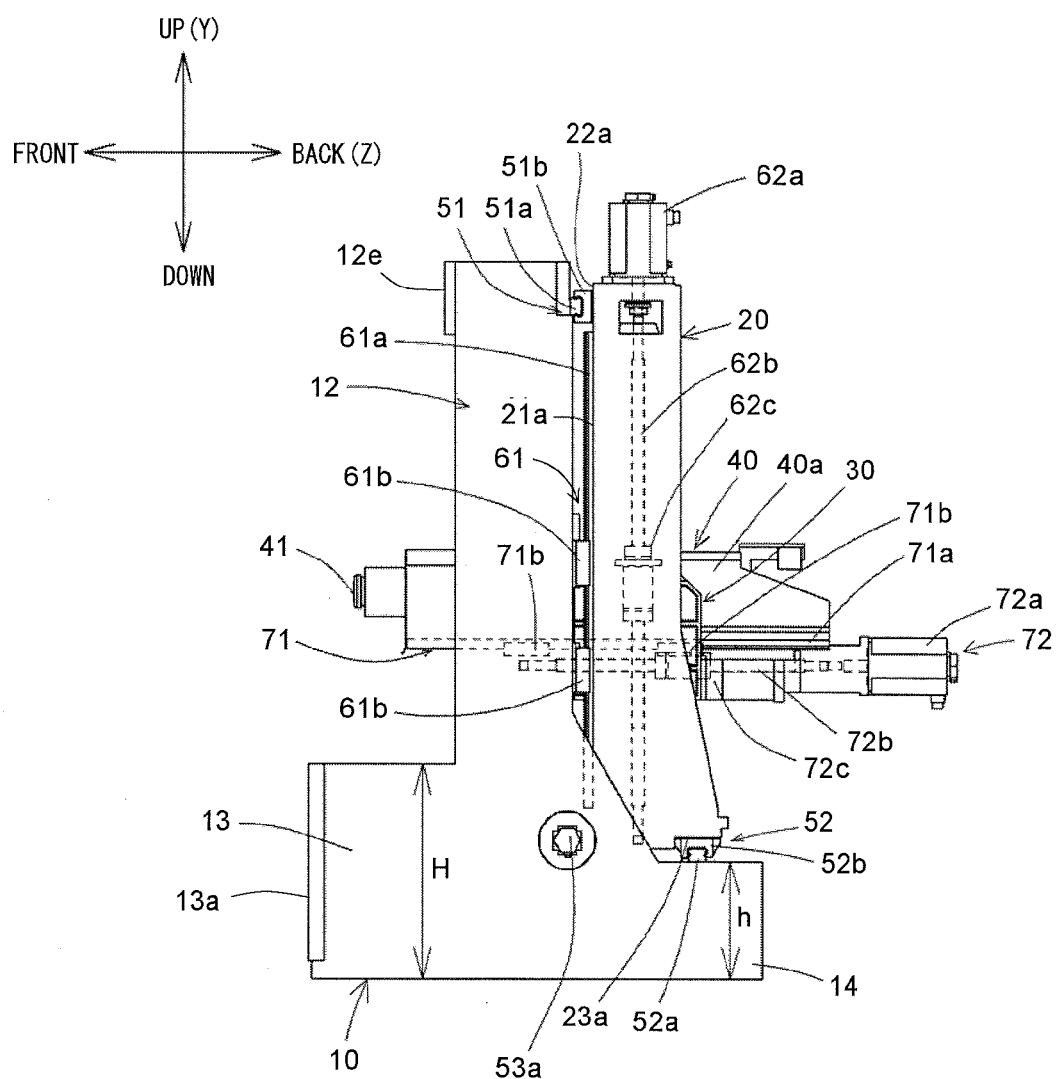
FIG. 3 is a right side view of the horizontal machining center in FIG. 1 according to one or more embodiments of the present invention.

As shown in FIG. 3, a vertical thickness h of the base back portion 14 is smaller than a vertical thickness H of the base front portion 13 (h<H). Specifically, the base front portion 13 has the thickness H required to maintain rigidity of a machine main body in cutting the workpiece on a work table (not shown) placed on a jig table 80 (see FIG. 5) to be connected to a front face 13a of the base front portion 13. On the other hand, the base back portion 14 has the thickness h that is smaller than the thickness H of the base front portion 13 in order to lower positions of the first saddle 20 and other movable portions disposed on a top surface of the base back portion 14 so that a center of gravity of the whole machine can be lower.

As shown in FIG. 1, the base front portion 13 is provided with horizontal table portions 13d, 13d and the base back portion 14 is provided with a horizontal table portion 14a. A top surface 14b of the base back portion 14 (a top surface of the horizontal table portion 14a) is lower than a top surface of the base front portion 13 (top surfaces of the horizontal table portions 13d, 13d).

The base front portion 13 is provided with a chip discharge portion 15. The chip discharge portion 15 includes a chute 13b and a through hole 13c. Chips produced in machining of the workpiece fall to the chute 13b and are led into the through hole 13c and discharged to a chip conveyor (not shown) disposed below the base column 10. In this way, accumulation of the chips on the base portion 11 is minimized and decrease in machining accuracy due to thermal expansion of the machine is prevented.

Furthermore, the base front portion 13 is provided with the horizontal table portions 13d, 13d across the chip discharge portion 15, for securing rigidity of the machine main body. The horizontal table portions 13d, 13d serve as steps for a worker and as spaces on which tools and the like are placed at the time of maintenance.

The column portion 12 includes a pair of pillar members 12a, 12a standing on the base portion 11 and an upper beam member 12b connecting upper end portions of the pillar members 12a, 12a. The pillar members 12a, 12a are disposed at a predetermined interval in the left-right direction. A wall portion 12c guides the chips falling onto the chip discharge portion 15 into the through hole 13c to prevent accumulation of the chips on the machine main body, and also has a function as a lower beam member connecting lower end portions of the pillar members 12a, 12a. The pair of pillar members 12a, 12a, the upper beam member 12b, and the wall portion 12c form a square window 16 open in the front-back direction.

Figure 2:
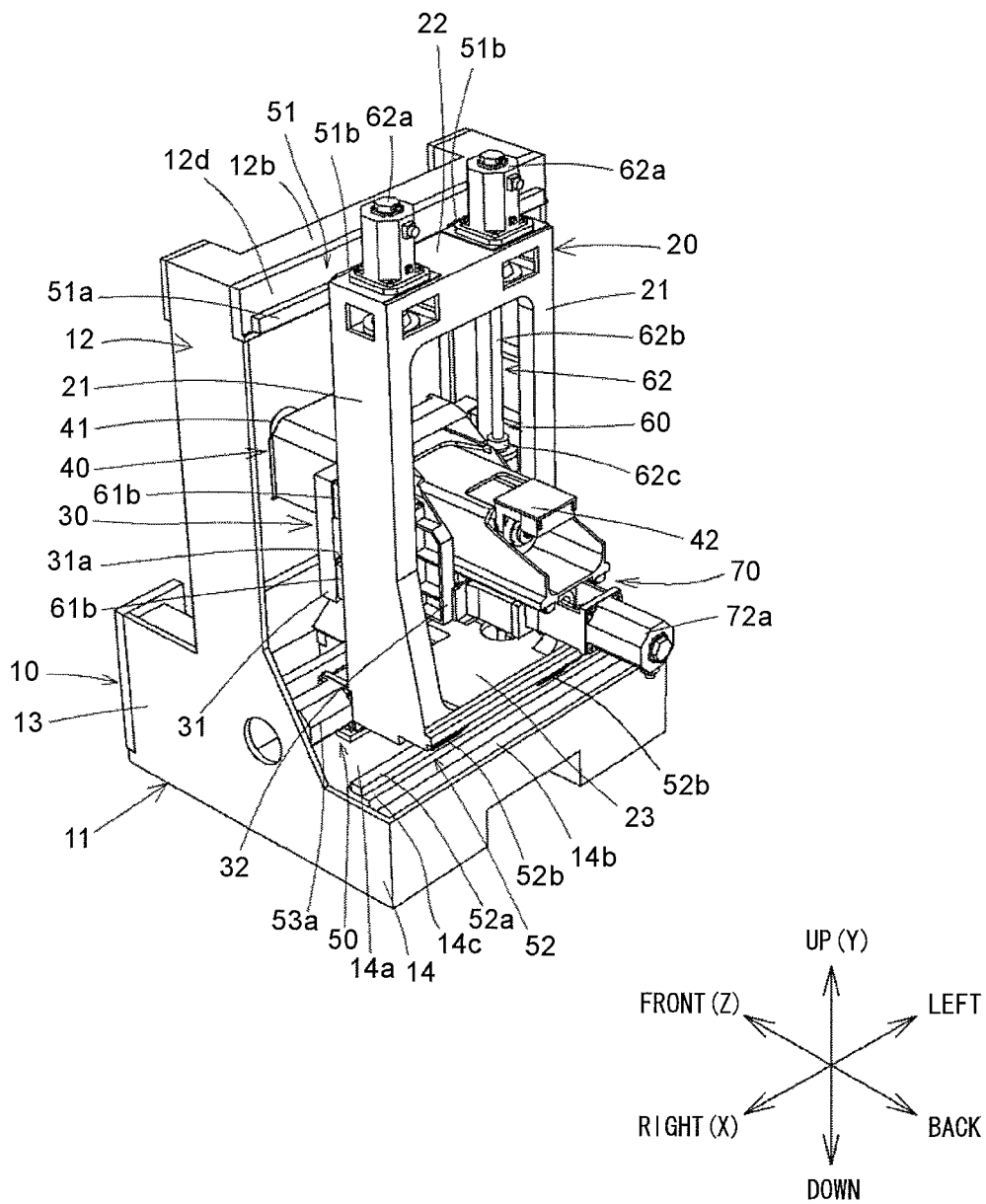
FIG. 2 is a perspective view of the horizontal machining center in FIG. 1 as seen from the back according to one or more embodiments of the present invention.

As shown in FIG. 2, a laterally long reference face 12d is provided to a back face of an upper portion of the column portion 12 (back face of the upper beam member 12b). An X-axis guide rail 51a of an X-axis guide mechanism 51, to be described later, is fixed to the reference face 12d. In addition, as shown in FIG. 1, a pair of square reference faces 12e, 12e are provided to front faces of upper portions of the pillar members 12a, 12a of the column portion 12. An automatic tool changing unit 100 (see FIG. 7), to be described later, is mounted to the reference faces 12e, 12e. A front face 12f of the upper beam member 12b is positioned behind the reference faces 12e, 12e so as not to interfere with the automatic tool changing unit 100 and a Y-axis cover 92 (see FIG. 6), to be described later.

(3) First Saddle

Figure 4:
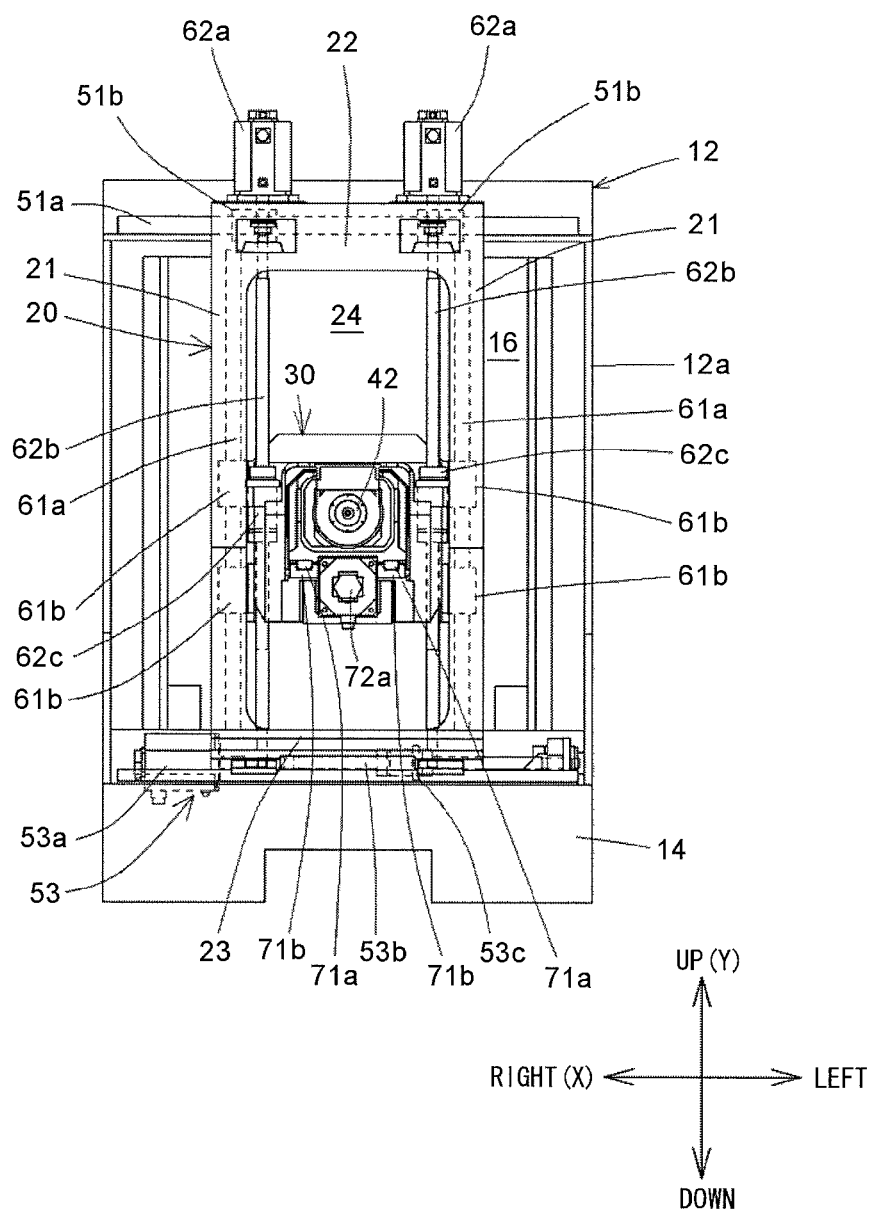
FIG. 4 is a back view of the horizontal machining center in FIG. 1 according to one or more embodiments of the present invention.

As shown in FIG. 2, the first saddle 20 is provided behind the column portion 12 and made of a frame-shaped member movable in the left-right direction. Specifically, the first saddle 20 includes a pair of left and right pillar members 21, 21, an upper beam member 22 connecting upper portions of the pillar members 21, 21, and a lower beam member 23 connecting lower portions of the pillar members 21, 21. These respective members 21 to 23 form a vertically long window 24 open in the front-back direction at a center of the first saddle 20 as shown in FIG. 4. The above-described square window 16 of the column portion 12 has a vertical length which is equal to or greater than that of the vertically long window 24 of the first saddle 20. Therefore, the square window 16 and the vertically long window 24 overlap each other in a back view in FIG. 4. An upper portion of the first saddle 20 is supported on the back face of the upper portion of the column portion 12 with the X-axis guide mechanism 51 interposed therebetween, and a lower portion of the first saddle 20 is supported on the horizontal table portion 14a of the base back portion 14 with an X-axis guide mechanism 52 interposed therebetween.

(4) X-Axis Movement Mechanism

An X-axis movement mechanism 50 is a mechanism for moving the first saddle 20 in the left-right direction and includes the X-axis guide mechanisms 51 and 52 and an X-axis feed mechanism 53.

The X-axis guide mechanism 51 includes the X-axis guide rail 51a and a pair of X-axis sliders 51b, 51b fitted with the X-axis guide rail 51a, and is provided between the upper portion of the first saddle 20 and the upper portion of the column portion 12 as shown in FIG. 3. As shown in FIG. 2, the X-axis guide rail 51a is mounted to the reference face 12d of the column portion 12 and extends to have a width slightly shorter than a left-right width of the reference face 12d. As shown in FIGS. 2 and 3, the X-axis sliders 51b, 51b are mounted to a front face 22a of the upper beam member 22 of the first saddle 20. The X-axis guide mechanism 51 is a known linear movement mechanism in which the X-axis sliders 51b, 51b move in the left-right direction along the X-axis guide rail 51a.

The X-axis guide mechanism 52 include an X-axis guide rail 52a and a pair of X-axis sliders 52b, 52b fitted with the X-axis guide rail 52a, and is provided between the lower portion of the first saddle 20 and the top surface of the base back portion 14 as shown in FIG. 3. As shown in FIG. 2, the X-axis guide rail 52a is mounted to a reference face 14c provided to the top surface 14b of the horizontal table portion 14a of the base back portion 14 and extends to have the same width as a left-right width of the reference face 14c. As shown in FIG. 3, the X-axis sliders 52b, 52b are mounted to an under surface 23a of the lower beam member 23 of the first saddle 20. The X-axis guide mechanism 52 is also a known linear movement mechanism in which the X-axis sliders 52b, 52b move in the left-right direction along the X-axis guide rail 52a.

The X-axis feed mechanism 53 includes an X-axis drive motor 53a disposed on the horizontal table portion 14a of the base back portion 14, an X-axis ball screw 53b connected to the X-axis drive motor 53a, and a nut 53c engaged by screwing with the X-axis ball screw 53b. The nut 53c is secured to the lower beam member 23 of the first saddle 20. By rotating the X-axis ball screw 53b by the X-axis drive motor 53a, the first saddle 20 moves in the left-right direction along the respective X-axis guide rails 51a and 52a. The X-axis feed mechanism 53 is a known ball-screw feed mechanism.

(5) Second Saddle

The second saddle 30 is supported on the first saddle 20 to be movable in the vertical direction. Specifically, the second saddle 30 is made of a cylindrical member retaining the spindle unit 40, and includes a flange portion 31 having a back face provided with Y-axis sliders 61b, to be described later, and a retaining portion 32 housing a Z-axis movement mechanism 70, to be described later, and the spindle unit 40. The second saddle 30 is supported on the first saddle 20 with a Y-axis guide mechanism 61, provided between the flange portion 31 and the pillar members 21, 21, interposed therebetween, and moves in the vertical direction in the vertically long window 24 of the first saddle 20.

(6) Y-Axis Movement Mechanism

A Y-axis movement mechanism 60 is a mechanism for moving the second saddle 30 in the vertical direction, and includes the Y-axis guide mechanism 61 and a Y-axis feed mechanism 62.

The Y-axis guide mechanism 61 includes a pair of Y-axis guide rails 61a, 61a and the plurality of Y-axis sliders 61b, 61b, . . . fitted with the respective Y-axis guide rails 61a, 61a. As shown in FIG. 3, the Y-axis guide mechanism 61 is provided between the upper portion of the first saddle 20 and the upper portion of the column portion 12. The X-axis guide mechanism 51 and the Y-axis guide mechanism 61 are positioned substantially in the same plane (X-Y plane). The Y-axis guide rails 61a, 61a are provided in the vertical direction on front faces 21a, 21a of the pillar members 21, 21 of the first saddle 20 from the upper portion to the lower portion of the first saddle 20. Two Y-axis sliders 61b, 61b are provided to each of a left portion and a right portion of a back face 31a (see FIG. 2) of the flange portion 31 of the second saddle 30. The Y-axis guide mechanism 61 is a known linear movement mechanism in which the respective Y-axis sliders 61b, 61b, . . . move in the vertical direction along the respective Y-axis guide rails 61a, 61a.

The Y-axis feed mechanism 62 includes a pair of Y-axis drive motors 62a, 62a mounted to a top surface of the upper beam member 22 of the first saddle 20, Y-axis ball screws 62b, 62b connected to the respective Y-axis drive motors 62a, 62a, and nuts 62c, 62c engaged by screwing with the respective Y-axis ball screws 62b, 62b. The nuts 62c, 62c are secured to the second saddle 30. By rotating the Y-axis ball screws 62b, 62b by the Y-axis drive motors 62a, 62a, the second saddle 30 moves in the vertical direction along the respective Y-axis guide rails 61a, 61a. The Y-axis feed mechanism 62 is a known ball-screw feed mechanism.

Although a pair of Y-axis feed mechanisms 62 are provided in the left-right direction in one or more embodiments, a single Y-axis feed mechanism 62 may be provided.

(7) Spindle Unit

The spindle unit 40 is supported on the second saddle 30 and includes the spindle 41, a spindle housing 40a, and a spindle drive motor 42. The spindle 41 is retained in the spindle housing 40a to be rotatable about the Z-axis. A back end portion of the spindle 41 is connected to a rotating shaft of the spindle drive motor 42, and various tools (not shown) are detachably attached to a front end portion of the spindle 41. A pair of Z-axis guide rails 71a, 71a of a Z-axis guide mechanism 71, to be described later, are mounted in a front-back direction to an under surface of the spindle housing 40a. The spindle unit 40 is retained in the flange portion 31 and the retaining portion 32 of the second saddle 30 with the Z-axis guide mechanism 71 interposed therebetween, and to be movable in the front-back direction. In this way, the spindle unit 40 is movable in the vertical direction and the front-back direction in the vertically long window 24 of the first saddle 20, and movable in the left-right direction, the vertical direction, and the front-back direction in the square window 16 of the column portion 12. The vertical length of the square window 16 is longer than a vertical stroke of the spindle 41.

Although the pair of Z-axis guide rails 71a, 71a are mounted to the under surface of the spindle housing 40a in one or more embodiments, another Z-axis guide rail may be further mounted to a center of a top surface of the spindle housing 40a.

(8) Z-Axis Movement Mechanism

The Z-axis movement mechanism 70 is a mechanism for moving the spindle unit 40 in the front-back direction, and includes the Z-axis guide mechanism 71 and a Z-axis feed mechanism 72.

The Z-axis guide mechanism 71 includes the pair of Z-axis guide rails 71a, 71a and a plurality of Z-axis sliders 71b, 71b, . . . fitted with the respective Z-axis guide rails 71a, 71a. The Z-axis guide rails 71a, 71a are mounted to the under surface of the spindle housing 40a as described above, and extends in the front-back direction from a front end portion to a back end portion of the spindle housing 40a. Two Z-axis sliders 71b, 71b are provided to each of a left portion and a right portion of the retaining portion 32 of the second saddle 30. The Z-axis guide mechanism 71 is a known linear movement mechanism in which the respective Z-axis sliders 71b, 71b, . . . move in the front-back direction along the respective Z-axis guide rails 71a, 71a. Note that the number of Z-axis sliders 71b provided to the second saddle 30 and places where they are disposed may be selected arbitrarily depending on the number of provided Z-axis guide rails 71a and places where they are disposed.

The Z-axis feed mechanism 72 includes a Z-axis drive motor 72a mounted to the retaining portion 32 of the second saddle 30 to protrude backward, a Z-axis ball screw 72b connected to the Z-axis drive motor 72a, and a nut 72c engaged by screwing with the Z-axis ball screw 72b. The nut 72c is secured to the spindle unit 40. By rotating the Z-axis ball screw 72b by the Z-axis drive motor 72a, the spindle unit 40 moves in the front-back direction along the respective Z-axis guide rails 71a, 71a. The Z-axis feed mechanism 72 is a known ball-screw feed mechanism.

(9) Jig Table

Figure 5:
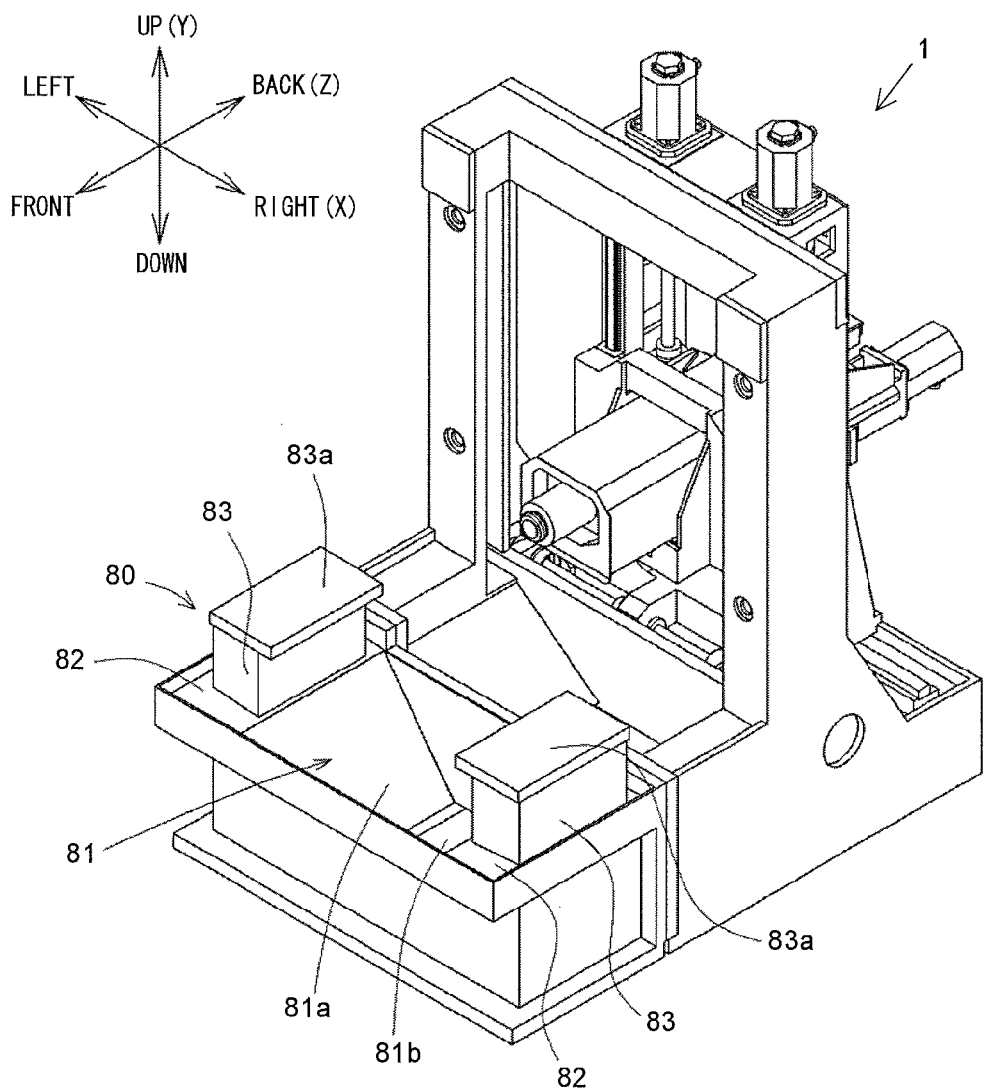
FIG. 5 is a perspective view showing a state in which a jig table is disposed in front of the horizontal machining center in FIG. 1 according to one or more embodiments of the present invention.

FIG. 5 shows a state in which the jig table 80 is disposed in front of the horizontal machining center 1. This jig table 80 is a structure mounted to the front face 13a (see FIG. 1) of the base front portion 13 of the base column 10 and fixed to the floor surface. A left-right width and a vertical height of the jig table 80 are equal to a left-right width and a vertical height of the base front portion 13. On the jig table 80, an A-axis tilt table (not shown) is placed, for example.

The jig table 80 is provided with a chip discharge portion 81 similar to the chip discharge portion 15 provided to the base front portion 13. The chip discharge portion 81 has a chute 81a and a through hole 81b. Chips produced in machining of the workpiece fall to the chute 81a, lead into the through hole 81b, and discharged from the through hole 81b to the chip conveyor (not shown) disposed below the jig table 80. In this way, accumulation of the chips on the jig table 80 is minimized, and decrease in machining accuracy due to thermal expansion of the jig table 80 is prevented.

Furthermore, the jig table 80 is also provided with horizontal table portions 82, 82 across the chip discharge portion 81, which are similar to the horizontal table portions 13d, 13d of the base front portion 13. Mounting tables 83, 83 are provided to top surfaces of the horizontal table portions 82, 82 and a drive portion and a support portion (not shown) for the A-axis tilt table are placed on mounting surfaces 83a, 83a of the mounting tables.

Although the jig table 80 on which the A-axis tilt table is placed is taken as an example in one or more embodiments, the jig table 80 may be a jig table on which a B-axis tilt table is placed. Moreover, a jig table of jig changer specification or a jig table of pallet changer specification may be provided. Furthermore, the chip discharge portion 81 may be omitted, and the chips may be discharged to the chip discharge portion 15 of the base front portion 13.

(10) Cover

Figure 6:
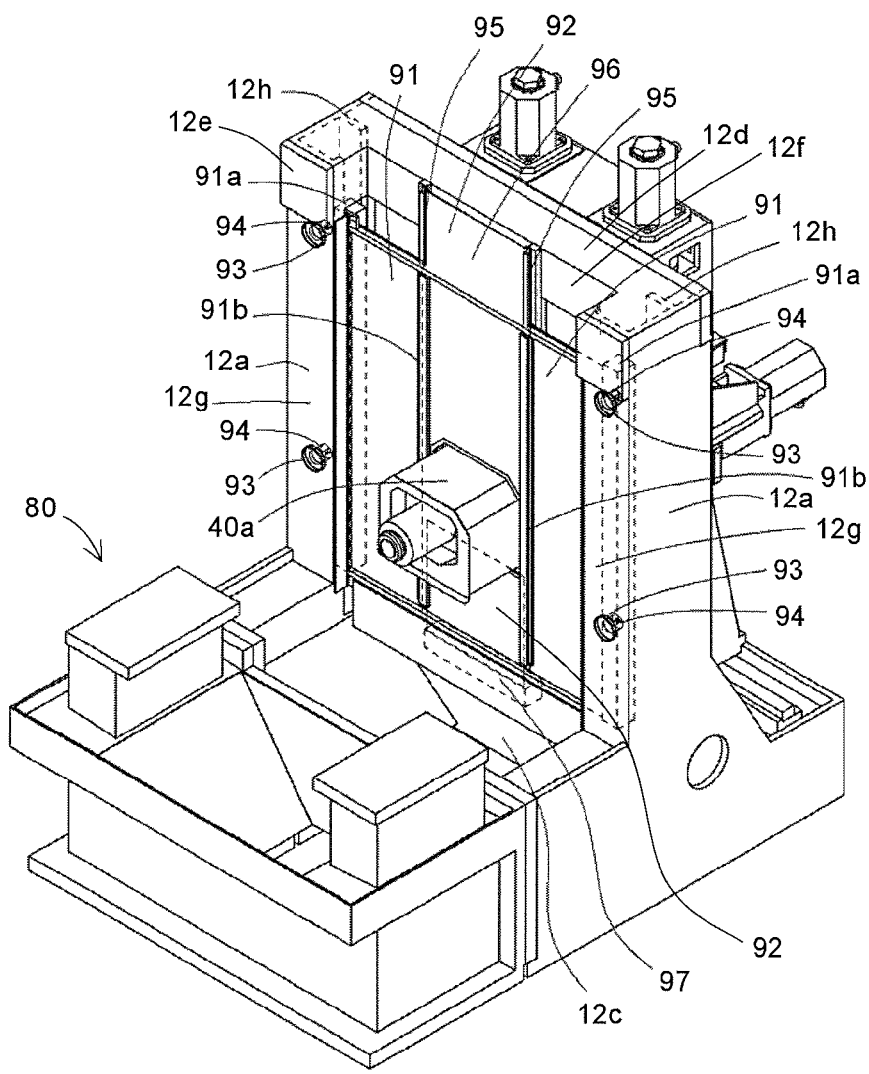
FIG. 6 is a perspective view showing a state in which a cover is provided to the horizontal machining center in FIG. 1 according to one or more embodiments of the present invention.
Figure 6:
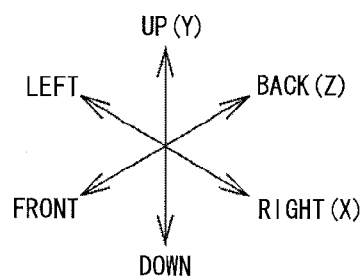

A structure of a cover provided to the column portion 12 will be described with reference to FIG. 6. The cover for covering the square window 16 (see FIG. 1) of the column portion 12 includes an X-axis cover 91 movable in the left-right direction in accordance with left-right movements of the spindle unit 40, and a Y-axis cover 92 movable in the vertical direction in accordance with vertical movements of the spindle unit 40.

The X-axis cover 91 and the Y-axis cover 92 are provided behind the front faces of the pillar members 12a, 12a of the column portion 12. Specifically, the X-axis cover 91 is provided between ribs 12h, 12h provided in the vertical direction from the upper ends to the wall portions 12c of the pillar members 12a, 12a and front face plate members 12g, 12g forming the front faces of the pillar members 12a, 12a. The ribs 12h, 12h are reinforcing portions for increasing strength of the pillar members 12a, 12a.

The X-axis cover 91 includes a pair of left and right covers. The respective covers are retractable covers, retracted by and housed into cover retracting portions 91a, 91a disposed behind the front face plate members 12g, 12g, and pulled out of the cover retracting portions 91a, 91a to cover the square window 16. The front face plate members 12g, 12g have a plurality of through holes 93, 93, . . . at given intervals in the vertical direction. Fixing members 94, 94, . . . for fixing the cover retracting portions 91a, 91a are inserted into the respective through holes 93, 93 from the front, and fixed to the front face plate members 12g, 12g by bolts or the like. The cover retracting portions 91a, 91a are fixed to retaining portions (not shown) fixed to the fixing members 94, 94, . . . from behind by bolts, and can be replaced from behind the column portion 12. Edge portions 91b, 91b of the cover pulled out of the cover retracting portions 91a, 91a face each other at an interval corresponding to a width of the spindle housing 40a so that the spindle housing 40a can move in the front-back direction. The edge portions 91b, 91b are also retained by a pair of guides 95, 95 which can move in the left-right direction.

The Y-axis cover 92 includes a pair of upper and lower covers. The upper cover 92 is a sliding cover made of an iron plate 96, and is guided by the pair of guides 95, 95 to move in the vertical direction. The iron plate 96 is positioned in front of the front face 12f of the upper beam member 12b and behind the reference faces 12e, 12e. The lower cover 92 is a retractable cover, which is retracted by and housed into a cover retracting portion 97 disposed in front of the wall portion 12c, and pulled out of the cover retracting portion 97 to cover a lower portion of the square window 16.

In this way, by disposing the X-axis cover 91 and the Y-axis cover 92 in the column portion 12 of the base column 10, a front-back depth can be shortened and the whole machine can be downsized as compared with a case in which the covers are disposed in front of the column portion 12.

Although the X-axis cover 91 is the retractable cover in one or more embodiments, the X-axis cover 91 may be a sliding cover. Similarly, although the lower Y-axis cover 92 is the retractable cover in one or more embodiments, the lower Y-axis cover 92 may be a sliding cover.

(11) Automatic Tool Changing Unit

Figure 7:
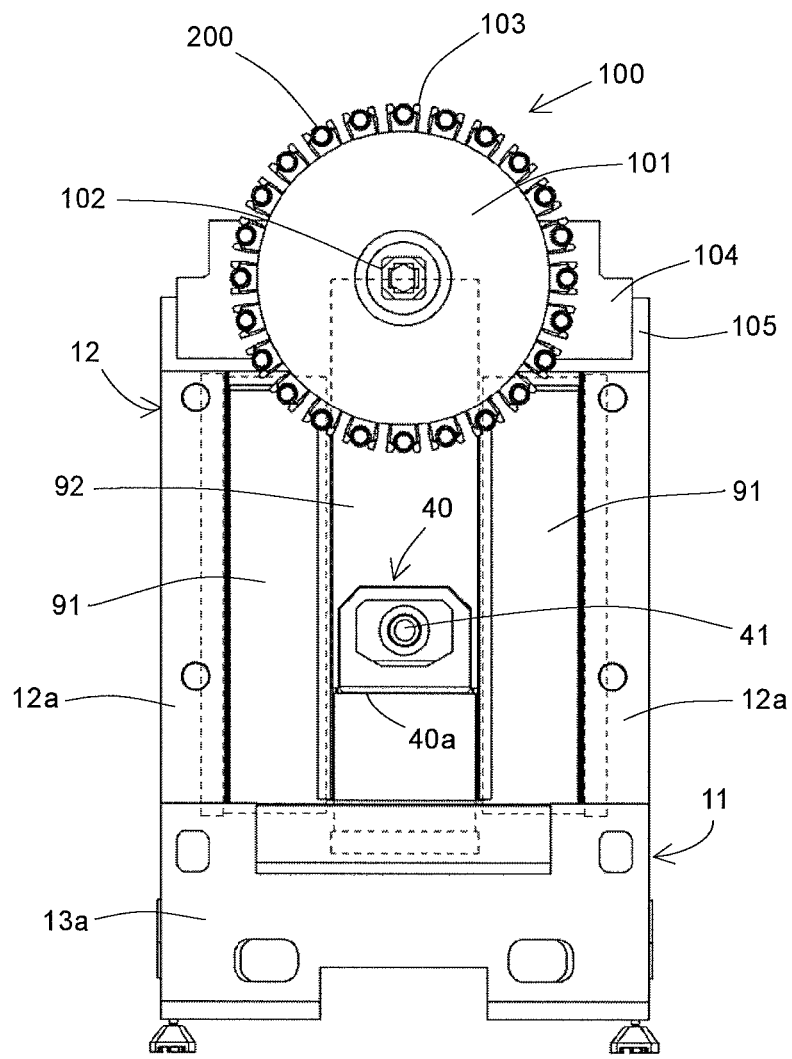
FIG. 7 is a front view showing a state in which an automatic tool changing unit is mounted to the horizontal machining center in FIG. 1 according to one or more embodiments of the present invention.
Figure 7:
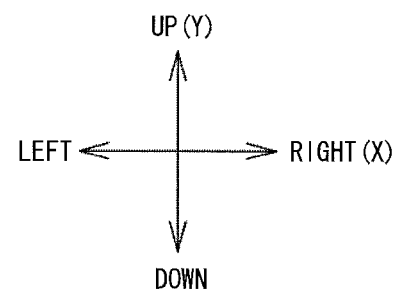
Figure 8:
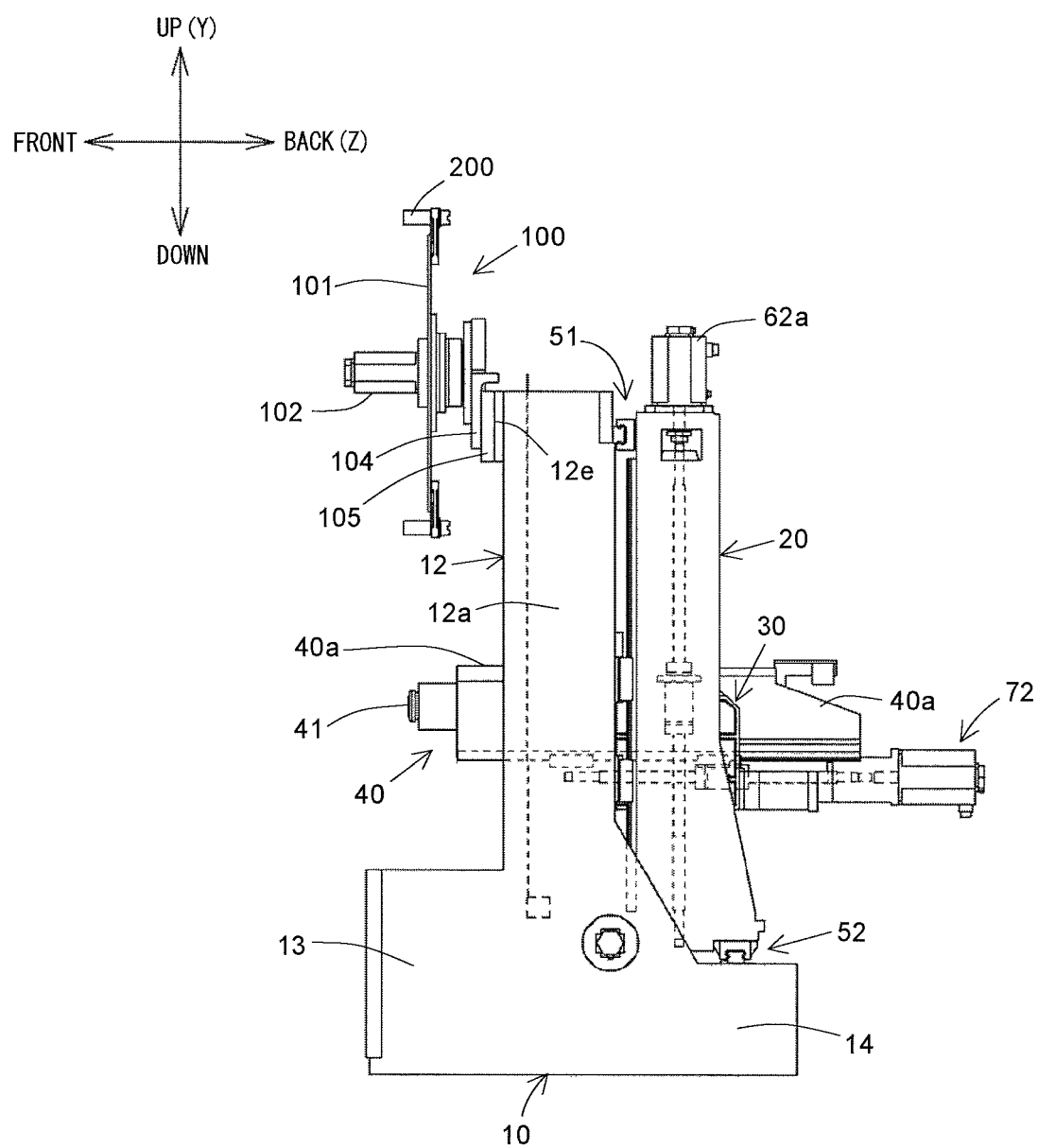
FIG. 8 is a right side view showing a state in which the automatic tool changing unit is mounted to the horizontal machining center in FIG. 1 according to one or more embodiments of the present invention.

FIGS. 7 and 8 show a state in which the automatic tool changing unit 100 (hereinafter referred to as "ATC unit") is mounted to the reference faces 12e, 12e (see FIG. 1) of the column portion 12. The ATC unit 100 has a known structure including a disc 101 rotated by a motor 102 and a large number of tool retaining portions 103 provided to an outer periphery of the disc 101. The tool retaining portions 103 retain replacement tools 200. Behind the disc 101, a retaining member 104 for retaining the disc 101 and the motor 102 and a mounting member 105 for mounting the ATC unit 100 to the reference faces 12e, 12e of the column portion 12 are disposed. The mounting member 105 is mounted to the reference faces 12e, 12e of the column portion 12 by fixing means such as bolts.

To change a tool mounted to the spindle 41, the spindle unit 40 is moved upward to exchange the tools with the ATC unit 100. Specifically, the spindle unit 40 is moved to a tool changing position on the X-axis by the X-axis feed mechanism 53, and the spindle unit 40 is moved to a tool changing position on the Z-axis by the Z-axis feed mechanism 72. Next, the spindle unit 40 is moved upward to a tool changing position on the Y-axis by the Y-axis feed mechanism 62. Then, when the spindle unit 40 retreats to a machine origin position on the Z-axis by the Z-axis feed mechanism 72, the tool attached to the spindle 41 is transferred to the tool retaining portion 103 of the ATC unit 100. Next, the motor 102 is driven to rotate the disc 101 until the replacement tool 200 arrives at a position just above the Z-axis. Then, by moving the spindle unit 40 forward from the machine origin position to the tool changing position on the Z-axis by the Z-axis feed mechanism 72, the new tool 200 in the tool retaining portion 103 is attached to the spindle 41. Thus the change of the tool is finished. One or more embodiments employs a so-called direct change system in which the tools are directly transferred and received between the ATC unit 100 and the spindle 41 in the tool change.

Even if the ATC unit 100 is mounted to the front face of the column portion 12, the tool change by the ATC unit 100 does not interfere with movements of the respective covers 91 and 92 because the X-axis cover 91 and the Y-axis cover 92 are provided behind the front face of the column portion 12.

(12) Operation and Effects of One or More Embodiments

In the horizontal machining center 1 of one or more embodiments, the base portion 11 and the column portion 12 are integrated to form the base column 10. Therefore, the base column 10 becomes a single structure and is increased in rigidity. Moreover, the base portion 11 and the column portion 12 need not be coupled by fixing members, which reduces the number of assembly man-hours and suppresses weight.

Furthermore, the base column 10 includes the base portion 11 and the column portion 12, and the base portion 11 has the thick base front portion 13 and the base back portion 14 having the smaller thickness than the base front portion 13. The column portion 12 stands between the base front portion 13 and the base back portion 14. Moreover, the X-axis guide mechanisms 51, 52 for guiding the first saddle 20 in the left-right direction are provided to the reference face 12d of the column portion 12 and the horizontal table portion 14a of the base back portion 14, and the first saddle 20 is disposed on the top surface 14b of the base back portion 14.

Therefore, the movable portions such as the first saddle 20 and the second saddle 30 can be disposed behind the column portion 12 and thus the front-back depth of the machine can be shortened and the whole machine can be downsized. Furthermore, maintenance operations of the respective movement mechanisms 50, 60, and 70 can be carried out easily from behind the machine. Hence, the step of detaching the cover in the related-art becomes unnecessary, which increases work efficiency.

Moreover, because the thickness H of the base front portion 13 can be secured by disposing the movable portions behind the column portion 12, deformation of the base column 10 can be suppressed and rigidity can be maintained against cutting resistance in machining of the workpiece. Furthermore, because the base front portion 13 has the sufficient thickness, it is possible to increase rigidity of the machine main body including the base column 10, the first saddle 20, the second saddle 30, the spindle unit 40, and the respective axis guide mechanisms 51, 52, 61, and 71. As a result, it is possible to maintain high positional accuracy of the machine main body with respect to the jig table 80 disposed on the front face of the base column 10, to eventually enhance machining accuracy of the workpiece.

Moreover, because the first saddle 20 is disposed on the top surface 14b of the base back portion 14 having the small thickness, it is possible to lower the respective positions of the first saddle 20, the second saddle 30 supported on the first saddle 20, and the spindle unit 40 supported on the second saddle 30. Therefore, the center of gravity of the whole machine becomes low and stability increases. Moreover, because the square window 16 of the column portion 12 has the vertical length equal to or greater than that of the vertically long window 24 of the first saddle 20, and the square window 16 and the vertically long window 24 overlap each other, the lowest travel position of the spindle 41 becomes low. Accordingly, it is possible to carry out detachment and attachment of the workpiece, inspection of the tip end of the spindle 41, inspection of the tools, and the like without using a stepstool. Furthermore, because the first saddle 20 is disposed on the base back portion 14 having the small thickness, the height of the whole machine is suppressed, which, coupled with the above-described shortening of the depth, can further downsize the machine. Moreover, even if the machine is made compact, respective strokes of the spindle 41 in the X-axis, Y-axis, and Z-axis directions are not shortened as compared with those in the related art.

In the horizontal machining center 1 of one or more embodiments, the X-axis guide rail 51a is disposed on the back face (reference face 12d) of the upper portion of the column portion 12, and the Y-axis guide rails 61a, 61a are disposed on the front faces 21a, 21a of the pillar members 21, 21 of the first saddle 20. Therefore, the X-axis guide mechanism 51 and the Y-axis guide mechanism 61 are between the back face of the column portion 12 and the front face of the first saddle 20, and positioned substantially in the same plane (X-Y plane). In this way, paths for transmitting forces to the jig table 80 are shortened, which suppresses accumulation of dimension change amounts of the respective parts due to thermal expansion, to thereby enhance the machining accuracy of the workpiece. Additionally, because the X-axis guide mechanism 51 and the Y-axis guide mechanism 61 are not separated from each other in the front-back direction, it is possible to further downsize the whole machine.

In the horizontal machining center 1 of one or more embodiments, the covers 91 and 92 for covering the square window 16 are positioned behind the front faces of the pillar members 12a, 12a of the column portion 12, and all of the respective axis movement mechanisms 50, 60, and 70 are positioned behind the column portion 12. In the related art, the saddle is disposed on the front face of the column portion and any of the respective axis movement mechanisms is disposed in front of the saddle, and therefore the cover needs to be disposed on the further front side of the axis movement mechanism. Such accumulation inevitably increases the front-back depth of the machine. On the other hand, in one or more embodiments, the covers 91 and 92 are positioned in the column portion 12, which shortens the front-back depth and suppresses increase of the size of the whole machine.

In the horizontal machining center 1 of one or more embodiments, the reference faces 12e, 12e to which the ATC unit 100 can be mounted are provided to the front face of the upper portion of the column portion 12. Therefore, extra works such as manufacturing a bracket to which the ATC unit 100 is attached or mounting the bracket to the column portion 12 are unnecessary. The preassembled ATC unit 100 can be directly mounted to the reference faces 12e, 12e. Moreover, because the ATC unit 100 is provided to the front face of the upper portion of the column portion 12 which is free from a space constraint, the ATC unit 100 can use the disc 101 which has the tool retaining portions 103 at its entire circumference, and can store the large number of tools 200 despite its compact size. Furthermore, by carrying out the tool change by moving the spindle unit 40 upward, a mechanism for moving the ATC unit 100 upward or downward becomes unnecessary. By employing the direct change system, an arm mechanism for changing the tool becomes unnecessary, which simplifies the structure. Moreover, the maintenance becomes easy and weight of the whole machine can be suppressed.

In the horizontal machining center 1 of one or more embodiments, the base front portion 13 of the base column 10 is provided with the chute 13b for discharging the chips. Therefore, the chips are less likely to accumulate on the base portion 11, and it is possible to prevent decrease in the machining accuracy due to the thermal expansion of the machine.

In the horizontal machining center 1 of one or more embodiments, the front face 13a of the base front portion 13 of the base column 10 is a reference face to which the jig table 80 can be connected. Therefore, various jig tables can be mounted according to user demands, and it is unnecessary to change the machine main body's design, which facilitates design standardization of the machine.

Furthermore, in the horizontal machining center 1 of one or more embodiments, the frame-shaped column portion 12 fixed to the base portion 11 constitutes the first column, and the frame-shaped first saddle 20 movable with respect to the base portion 11 constitutes the second column. Therefore, with the double-column structure having the first and second columns, it is possible to obtain high rigidity and high stability.

(13) Other Embodiments

In one or more embodiments of the present invention, the following various embodiments can be employed besides the above-described embodiments.

Although the base portion 11 and the column portion 12 are formed integrally in the above-described embodiments, the base portion 11 and the column portion 12 may be formed as separate bodies and may be coupled by using fixing members such as bolts.

The lower X-axis guide mechanism 52 out of the X-axis guide mechanisms 51 and 52 is provided between the under surface of the lower portion of the first saddle 20 and the top surface 14b of the base back portion 14 in the above-described embodiments. Alternatively, the X-axis guide mechanism 52 may be provided between a back face of a lower portion of the column portion 12 and a front face of the lower portion of the first saddle 20.

The X-axis guide rail 51a is provided on the side of the base column 10, and the X-axis sliders 51b are provided on the side of the first saddle 20 in the above-described embodiments. In contrast, the X-axis guide rail 51a may be provided on the side of the first saddle 20, and the X-axis sliders 51b may be provided on the side of the base column 10. The same applies to the X-axis guide rail 52a and the X-axis sliders 52b.

The Y-axis guide rails 61a are provided on the side of the first saddle 20, and the Y-axis slider 61b is provided on the side of the second saddle 30 in the above-described embodiments. In contrast, the Y-axis guide rails 61a may be provided on the side of the second saddle 30, and the Y-axis slider 61b may be provided on the side of the first saddle 20.

The Z-axis guide rails 71a are provided on the side of the spindle housing 40a, and the Z-axis sliders 71b are provided on the side of the second saddle 30 in the above-described embodiments. In contrast, the Z-axis guide rails 71a may be provided on the side of the second saddle 30, and the Z-axis sliders 71b may be provided on the side of the spindle housing 40a.

The pair of square reference faces 12e, 12e are provided to the upper portion of the column portion 12 as the reference faces to which the ATC unit 100 is mounted in the above-described embodiments. Alternatively, a single horizontally-long reference face may be provided to the upper portion of the column portion 12.

The spindle unit 40 is moved upward to the tool changing position to carry out the tool change in the above-described embodiments. Alternatively, an ascending/descending mechanism (not shown) for moving the ATC unit 100 upward or downward may be provided, and the ATC unit 100 may be moved downward by the ascending/descending mechanism to carry out the tool change.

Although the example in which one or more embodiments of the present invention are applied to the machining center has been described above, one or more embodiments of the present invention may be applied to machine tools other than the machining center.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

REFERENCE SIGNS LIST

1 horizontal machining center (machine tool)
10 base column
11 base portion
12 column portion (first column)
13 base front portion
13a front face
13b chute
14 base back portion
14b top surface
12 column portion
12a pillar member
12d reference face
12e reference face
16 square window
20 first saddle (second column)
24 vertically long window
30 second saddle
40 spindle unit
51 X-axis guide mechanism
52 X-axis guide mechanism
61 Y-axis guide mechanism
71 Z-axis guide mechanism
80 jig table
91 X-axis cover
92 Y-axis cover
100 ATC unit

The invention claimed is:
1. A machine tool comprising:
a spindle unit having a longitudinal axis extending in a front-back direction, the spindle unit configured to have a tool mounted at a front thereof;
a base column having a base portion and a column portion provided on the base portion;
a first saddle supported behind the column portion and movable in a left-right direction, with respect to the front-back direction;
a second saddle supported on the first saddle and movable in a vertical direction, the spindle unit being supported on the second saddle and being movable in the front-back direction;
a pair of X-axis guide mechanisms for guiding movements of the first saddle in the left-right direction;
a pair of Y-axis guide mechanisms for guiding movements of the second saddle in the vertical direction; and
a pair of Z-axis guide mechanisms for guiding movements of the spindle unit in the front-back direction, wherein
the base portion has a base front portion in front of the column portion and a base back portion behind the column portion, respectively, a top surface of the base back portion is lower than a top surface of the base front portion, the first saddle is disposed on the top surface of the base back portion, and one of the pair of X-axis guide mechanisms and each of the pair of Y-axis guide mechanisms are provided between the first saddle and the column portion and are positioned substantially in the same plane.

2. The machine tool according to claim 1, wherein
one of the pair of X-axis guide mechanisms is provided between an upper portion of the first saddle and an upper portion of the column portion, and the other of the pair of X-axis guide mechanisms is provided between a lower portion of the first saddle and the top surface of the base back portion.

3. The machine tool according to claim 2, wherein
the first saddle has a vertically-long window at a center and the second saddle moves in the vertical direction in the vertically-long window of the first saddle.

4. The machine tool according to claim 2, wherein a front face of the upper portion of the column portion is provided with a reference face to which an automatic tool changing unit can be mounted.

5. The machine tool according to claim 2, wherein the base front portion of the base column is provided with a chute for discharging chips.

6. The machine tool according to claim 2, wherein a front face of the base front portion of the base column is a reference face to which a jig table can be connected.

7. The machine tool according to claim 1, wherein
the first saddle has a vertically-long window at a center and the second saddle moves in the vertical direction in the vertically-long window of the first saddle.

8. The machine tool according to claim 7, wherein
the column portion has a pair of pillar members standing on the base portion, a square window is formed between the pair of pillar members, and the square window has a vertical length equal to or greater than that of the vertically-long window of the first saddle.

9. The machine tool according to claim 7, wherein a front face of the upper portion of the column portion is provided with a reference face to which an automatic tool changing unit can be mounted.

10. The machine tool according to claim 7, wherein the base front portion of the base column is provided with a chute for discharging chips.

11. The machine tool according to claim 8, wherein
the column portion is provided with a cover for covering the square window, the cover includes an X-axis cover movable in the left-right direction and a Y-axis cover movable in the vertical direction, and the X-axis cover and the Y-axis cover are provided behind front faces of the pair of pillar members.

12. The machine tool according to claim 8, wherein a front face of the upper portion of the column portion is provided with a reference face to which an automatic tool changing unit can be mounted.

13. The machine tool according to claim 8, wherein the base front portion of the base column is provided with a chute for discharging chips.

14. The machine tool according to claim 11, wherein a front face of the upper portion of the column portion is provided with a reference face to which an automatic tool changing unit can be mounted.

15. The machine tool according to claim 11, wherein the base front portion of the base column is provided with a chute for discharging chips.

16. The machine tool according to claim 1, wherein a front face of the upper portion of the column portion is provided with a reference face to which an automatic tool changing unit can be mounted.

17. The machine tool according to claim 16, wherein the base front portion of the base column is provided with a chute for discharging chips.

18. The machine tool according to claim 1, wherein the base front portion of the base column is provided with a chute for discharging chips.

19. The machine tool according to claim 1, wherein a front face of the base front portion of the base column is a reference face to which a jig table can be connected.

20. The machine tool according to claim 1, wherein
the column portion constitutes a first column fixed to the base portion, the first saddle constitutes a second column movable with respect to the base portion, and wherein the first and second columns form a double column structure.

* * * * *